US010489672B2

(12) United States Patent
Isaev

(10) Patent No.: US 10,489,672 B2
(45) Date of Patent: *Nov. 26, 2019

(54) VIDEO CAPTURE IN DATA CAPTURE SCENARIO

(71) Applicant: ABBYY Development LLC, Moscow (RU)

(72) Inventor: Andrey Isaev, Moscow Region (RU)

(73) Assignee: ABBYY PRODUCTION LLC, Moscow (RU)

( * ) Notice: Subject to any disclaimer, the term of this patent is extended or adjusted under 35 U.S.C. 154(b) by 211 days.

This patent is subject to a terminal disclaimer.

(21) Appl. No.: 15/627,334

(22) Filed: Jun. 19, 2017

(65) Prior Publication Data
US 2017/0286796 A1    Oct. 5, 2017

Related U.S. Application Data

(63) Continuation of application No. 14/967,645, filed on Dec. 14, 2015, now Pat. No. 9,684,843.

(30) Foreign Application Priority Data

Oct. 22, 2015   (RU) .............................. 2015145447

(51) Int. Cl.
G06K 9/34 (2006.01)
G06K 9/00 (2006.01)
G06K 9/62 (2006.01)

(52) U.S. Cl.
CPC ......... *G06K 9/344* (2013.01); *G06K 9/00449* (2013.01); *G06K 9/00463* (2013.01);
(Continued)

(58) Field of Classification Search
None
See application file for complete search history.

(56) References Cited

U.S. PATENT DOCUMENTS 6,608,930 B1    8/2003  Agnihotri
6,614,930 B1 *  9/2003  Agnihotri .............. G06K 9/325
382/173
(Continued)

FOREIGN PATENT DOCUMENTS

RU      2421810       6/2011
WO   WO2006002009    1/2006

OTHER PUBLICATIONS

Kim et al., "A new approach for overlay text detection and extraction from complex video scene", IEEE Transactions on Image Processing, vol. 18, No. 2, pp. 401-411, 2009. (Year: 2009).*

(Continued)

*Primary Examiner* — Feng Niu
(74) *Attorney, Agent, or Firm* — Lowenstein Sandler LLP

(57) ABSTRACT

A data capture component of a mobile device receives information for an identification of a data field in a physical document. The data capture component receives a video stream comprising a plurality of frames, wherein each frame comprises a portion of the physical document. A frame is selected from the plurality of frames in the video stream. One or more text regions in the frame are identified. Each of the identified text region(s) in the frame is processed to identify data of each of the identified text region(s) and to select data of one of the identified text region(s) that corresponds to a set of attributes associated with the data field. The selected data is then compared with data of text regions of a subsequent frame. If the data of the text regions of the subsequent frame is a closer match to the set of attributes, the selected data is updated. A display field is then provided with the selected data for presentation with the frame in a user interface.

20 Claims, 6 Drawing Sheets

(52) U.S. Cl.
CPC ....... *G06K 9/00744* (2013.01); *G06K 9/6201* (2013.01); *G06K 2209/01* (2013.01)

(56) References Cited

U.S. PATENT DOCUMENTS

| | | | |
|---|---|---|---|
| 8,452,132 | B2 | 5/2013 | Isaev et al. |
| 8,548,280 | B2 * | 10/2013 | Sayers .................... G06T 11/60 |
| | | | 382/321 |
| 8,861,856 | B2 | 10/2014 | Deryagin et al. |
| 9,436,892 | B2 * | 9/2016 | Hu ..................... G06K 9/00288 |
| 9,842,409 | B2 * | 12/2017 | Kuwahara ............ H04N 19/172 |
| 2005/0173280 | A1 | 8/2005 | Cornelius et al. |
| 2005/0289182 | A1 * | 12/2005 | Pandian ............. G06K 9/00442 |
| 2013/0054595 | A1 | 2/2013 | Isaev et al. |
| 2013/0318426 | A1 | 11/2013 | Shu et al. |
| 2014/0023247 | A1 * | 1/2014 | Kuwahara ............ H04N 19/172 |
| | | | 382/118 |
| 2014/0267397 | A1 * | 9/2014 | Wagner ................. G06T 19/006 |
| | | | 345/633 |
| 2016/0328827 | A1 | 11/2016 | Ilic |

OTHER PUBLICATIONS

Meshesha, "Recognition and Retrieval from Document Image Collections", Ph.D. thesis, International Institute of Information Technology, Hyderabad, India, (downloaded from https://cvit.iiit.ac.in/research/thesis/doctoraldissertations/recognition-and-retrieval-from-document-image-collections), 2008, 222 pages.

\* cited by examiner

VIDEO CAPTURE IN DATA CAPTURE SCENARIO

CROSS REFERENCE TO RELATED APPLICATIONS

This continuation application claims priority to U.S. patent application Ser. No. 14/967,645 filed on Dec. 14, 2015, which claims priority to Russian patent application No. 2015145447, filed on Oct. 22, 2015; which are hereby incorporated by reference herein.

TECHNICAL FIELD

The present disclosure is generally related to computer systems, and more particularly, to facilitating data capture in video streams.

BACKGROUND

Optical Character Recognition (OCR) is the electronic conversion of scanned or photographed images of typewritten or printed text into computer-readable text. OCR is a common method of digitizing printed texts so that they can be electronically edited, searched, displayed on-line, and used in processes such as text-to-speech, data extraction, and text mining. Some commercial OCR systems are capable of reproducing formatted output that closely approximates the original scanned page including images, columns, and other non-textual components. Specialized data entry systems can permit a user to scan a physical document, which may be subsequently submitted for OCR and processed to identify meaningful fields in targeted portions of the document.

SUMMARY

In accordance with one or more aspects of the present disclosure, a data capture component of a mobile device may receive information for an identification of a data field in a physical document. The data capture component may receive a video stream comprising a plurality of frames, wherein each frame comprises a portion of the physical document. A frame may be selected from the plurality of frames in the video stream. One or more text regions in the frame may be identified. Each of the identified text region(s) in the frame may be processed to identify data of each of the identified text region(s) and to select one of the identified text region(s) whose data corresponds to a set of attributes associated with the data field. The selected data may then be compared with data of text regions of a subsequent frame. If the data of the text regions of the subsequent frame is a closer match to the set of attributes, the selected data may be updated. A display field may then be provided with the selected data for presentation with the frame in a user interface.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
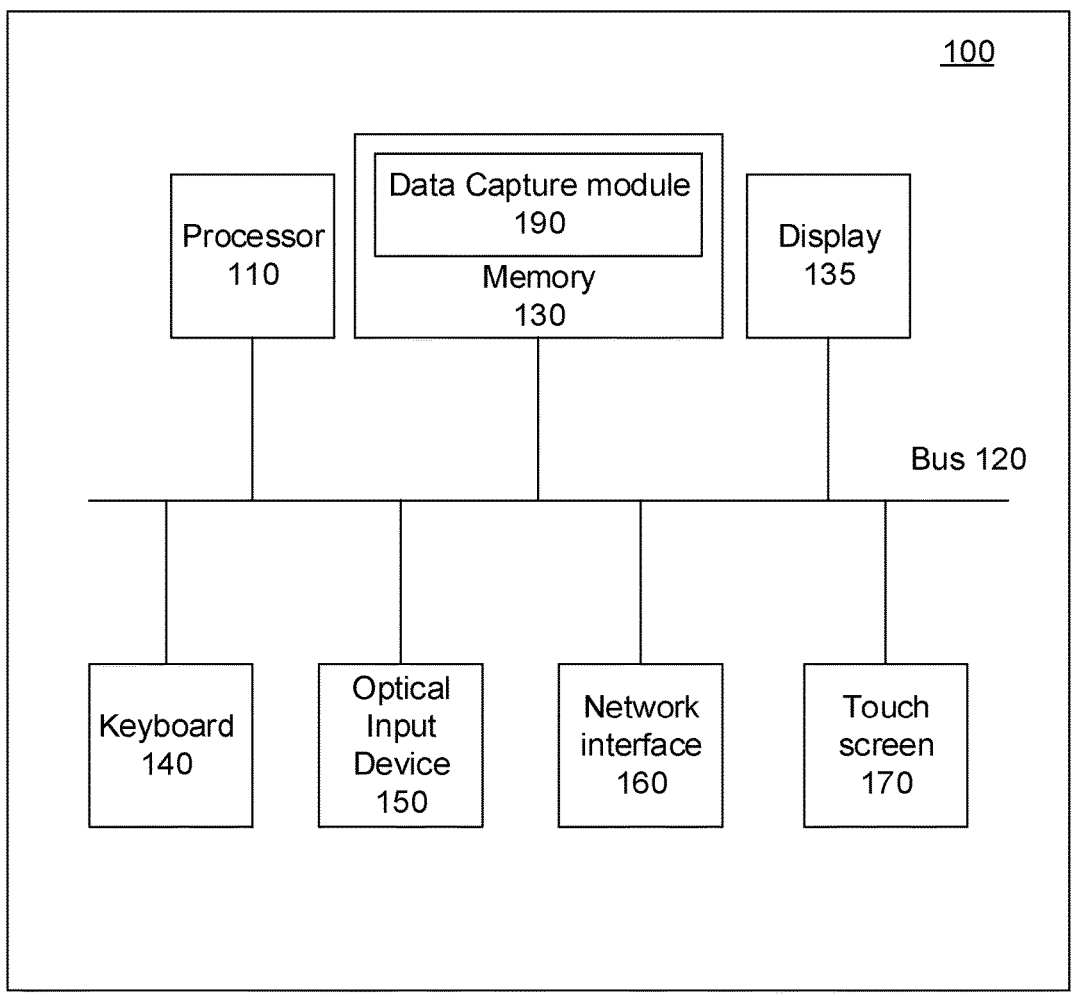
FIG. 1 depicts a high-level component diagram of an example computing device architecture, in accordance with one or more aspects of the present disclosure.

Described herein are methods and systems for video capture in a data capture scenario. Specialized data entry systems can permit a user to scan a physical document, which may be subsequently submitted for OCR and processed to identify meaningful fields in targeted portions of the document. However, these types of systems can be cumbersome since they often require one or more personal computers, one or more scanning devices, OCR or data capture software, and digital templates. Digital template generation can require a specialized skill set that may not be readily available, and possibly expensive. The equipment, software, and template generation can prove to be cost prohibitive to implement. Moreover, the hardware required to implement such a system is not feasible for users that rely on mobility in processing documents (e.g., insurance claim processing, sales, expense reports, etc.).

Aspects of the present disclosure address the above noted and other deficiencies by implementing a flexible, lower cost alternative platform to capture data from physical documents using mobile devices (e.g., smart phones, tablet computers, etc.). Data may be captured from data fields on physical documents (forms, questionnaires, financial documents, etc.) using mobile devices with built-in cameras, processed using OCR, and either stored locally or sent to remote databases all within an application executing on the mobile device. Data fields on a physical document may be targeted using the viewfinder of the built-in camera, and may be immediately seen and verified on the screen of the mobile device by a user operating the mobile device. Multiple data fields of the physical document can be captured in a video stream, and each frame of the stream may be analyzed to compare all identified text regions in each frame of the stream to identify the best match for a particular target data field in a physical document.

In an illustrative example, a computer system implementing the methods described herein may present a user interface assisting a user with identifying a target data field in a physical document. The user interface may be invoked by a data capture component that executes on a mobile device. The data capture component may be a mobile application (or part of a mobile application) installed on a mobile device that includes a camera capable of receiving a video stream such as a mobile phone, personal data assistant (PDA), camera, video camera, laptop computer, etc. For example, a user may launch an application on a camera-equipped mobile phone, and a user interface may subsequently be presented that assists the user with identifying a target field whose data should be recognized. In an illustrative example, the user interface may present a graphical indicator on the screen of the mobile device (e.g., crosshairs, a target icon, etc.) to direct the user to point the crosshair of the mobile device viewfinder at a particular data field of the document to be captured. In another illustrative example, the user interface may present a message instructing the user to point the crosshair on the particular data field in the physical document.

The data capture component may be configured to process particular types of documents (payment documents, letters of association, etc.) and could include a list of document fields containing the data to entry (e.g., Company Name, Bank Identification Code, Account Number, Reason for Payment, Payment Sum) as well as the type of data common for each field (e.g., Address, Time, Date, Cash Amount, Name, Code, Text, Number, etc.), the number of character spaces, additional data control rules enabling verification of the recognized field data (e.g., dictionaries, regular expressions, check sums, etc.), or the like. In an illustrative example, the data capture component may be configured for processing a specific document type. Alternatively, the data capture component may be configured to process several document types, requesting the document type from the user via a user interface when the component is activated (e.g., when an application is launched on a mobile phone). The data capture component may also be configured to receive supported document types from a server. The data capture component may determine the document to be processed (e.g., via a specific user request, location information, application context information, etc.), send a request to a server for the fields common for the type of the requested document, and store the information on the mobile device to process the document.

In addition to causing the presentation of the user interface assisting the user with the identification of the target data field, the data capture component may also activate the camera of the mobile device (e.g., prior to the presentation of the user interface, during the presentation of the user interface, etc.). The data capture component may then receive a video stream from the camera of the mobile device. The video stream may be made up of multiple image frames, where each frame may include a portion of the physical document containing the target data field. A frame can include content (e.g., an image) displayed on the screen of the mobile device and can be produced using the camera viewfinder. The frame can be transmitted in real time without recording the video, capturing the image, or storing the image in memory or a persistent data store. The viewfinder may support real time transfer of the video data from the mobile device camera to its display. As noted in the example above, the user may be directed to point the crosshair of the mobile device viewfinder at the target data field.

The data capture component may subsequently select a frame from the multiple frames in the video stream. In some implementations, the frames may be selected for processing in the mobile device at a predetermined rate. For example, the frames may be selected from the video stream at a rate of every 10th frame per second. Alternatively, other rates may be used (e.g., every first, second, fourth, sixth frame per second, etc.). Additionally, a frame may be selected if the mobile device camera is focused on the object to be captured (e.g., the portion of the physical document potentially containing the data field) for a certain period of time (e.g., ½ second, one second, two seconds, etc.).

Once a frame has been selected, the data capture component may then analyze the frame to identify one or more text regions present in the frame. In some implementations, the data capture component may then determine data of each of the text regions. The data of each identified text region may include the text data (a result of OCR of the text region) and attribute values for the text data. The data capture component may then analyze the data of each of the text regions in the image frame to identify the text region whose data corresponds to a set of attributes associated with the data field (or description of the data field). Text regions may be identified, for example, by using identification of connected components (elementary objects built by the meeting points of the image of the same chromaticity) and subsequently grouping them into potential words. Alternatively, the text regions may be identified using any similar method of text detection in images.

The data capture component may then determine the text data of each of the identified text regions in the frame using optical character recognition (OCR). The image of the text region can thus be converted into text data (e.g., sequences of codes used to represent the characters on a computer/a mobile device). The resulting text data may include a hypothesis for each character as well as the location of each character in the frame (e.g., the coordinates of each character within the frame). Additionally, each character may be assigned a confidence level of the hypothesis for each character according to a predetermined set of rules in order to limit false recognition. The confidence level may represent a predetermined difference between confidently and unconfidently recognized characters. If the confidence level of a character meets a predetermined confidence threshold condition, the character may be designated as "confidently recognized." If the confidence level of a character does not meet the predetermined confidence threshold condition, the data capture component may generate a message asking for confirmation of the recognized character. In some implementations, the threshold condition may be configured higher or lower to adjust the number of characters that may require verification.

The data capture component may also identify the set of attributes associated with the target data field in the physical document. The attributes can include rules, features, or characteristics associated with the target data field to assist the data capture component with identifying the text region in the frame whose data most closely matches the target data field of the physical document. In an illustrative example, an attribute may include the type of data to be captured (e.g., a property of the field data such as numerical data, textual data, customer name, social security number, etc.). For example, if the target field in the physical document is a date field, any identified text regions within the frame may be compared to a date format (e.g., mm/dd/yyyy, dd/mm/yyyy, yyyy/mm, etc.) to determine if any of the text regions within the frame contain a valid date.

In another illustrative example, an attribute may be the proximity to the viewfinder crosshair. In some implementations, the display of crosshairs (or an equivalent graphical indicator) in the viewfinder can be used to assist a user with identifying the target data field of the physical document. Accordingly, the closer an identified text region in the frame is to the location of the crosshair in the viewfinder of the mobile device camera, the higher the probability that the identified text region matches the target data field of the physical document.

In another illustrative example, attributes may include additional data validation rules. The data validation rules may include certain conditions applied to data of fields and automatically checked by the data capture component. Examples of the data verification rules are checking the text data against databases (e.g., a dictionary of names, dictionary of bank identifier codes, etc.), comparing the text data against the lists of known valid values. Additionally, text data from several text regions may be compared as well. For example, if a document contains several numeric fields as well as their associated sum, a data validation rule may be used to independently recalculate the sum of recognized data of all applicable identified text regions and compare the result with the recognized data of the appropriate text region.

In another illustrative example, an attribute may include the quality of character recognition within the text region. In some implementations, the quality of recognition may be measured by the number of unconfidently recognized characters (as described above). The greater the number of unconfidently recognized characters, the lower the quality of recognition for the text region. Similarly, the lower the number of unconfidently recognized characters, the higher the quality of recognition for the text region.

In another illustrative example, an attribute may include the number of times a particular text region is identified as a closer match to the target data field by the data capture component and displayed in the user interface as described in further detail below. If a particular text region has been identified as the closer match to the target data field in a few processed frames, but has not been confirmed by a user via the user interface, the data capture component may determine that the identified text region does not match the data field. If the number of received image frames exceeds a threshold value, the data capture component may attempt to display a text region that is identified as less of a match to the target data field. For example, the data capture component may request a particular price field where there are multiple price fields in the frame. If one price field is identified in the frame based on its proximity to the crosshairs of the view finder in ten subsequent frames without being confirmed by a user, the data capture component may attempt to identify a different price field present in the frame.

In another illustrative example, an attribute may include a data format such as an acronym format or quotation marks. For example, if the text region contains a "Co." in the text data, the data capture component may determine the text region to be a company name. Additionally, the data format may include line spaces above and below the text region, dividing lines (vertical or horizontal lines that may indicate a field in a table), or similar formatting indicators that may be present in a physical document.

Although several illustrative examples of attributes have been described above, it should be noted that other types of attributes may be used. Once the data capture component has identified the attributes associated with the data field, the values for the set of attributes may then be determined for the text data of each text region in the frame. Additionally, each attribute may be assigned a weight that can indicate its relative importance in identifying a text region that may match the target data field. For example, the proximity of the text region to the crosshairs may be assigned a greater weight since it would be expected that a user would place the crosshairs over the target data field of the physical document while the camera is receiving the video stream. Alternatively, the data format may be given a greater weight than the one assigned based on the proximity to the crosshairs if a large number of text regions are present in the frame, only one of which appears to have the proper format.

The data capture component may determine the attribute weight for each attribute value and subsequently determine a total attribute weight for text data of each of the text regions by summing the weights for the individual attribute values associated with text data of each of the text regions. In some implementations, the text data, the attribute values and their corresponding weights may be stored for later use in comparing data of text regions of other subsequently received frames. The data capture component may then identify the data of the text region associated with the total attribute weight having the largest value when compared to the total attribute weights of the data of the other identified text regions in the frame. The data of the identified text region with the greatest total attribute weight may then be selected as the text region data that most closely matches the target data field from the physical document (e.g., the "best" possible match for the received frame).

The data capture component may then store the selected text data and associated attributes of the identified text region as a candidate for the closest match. The data capture component may additionally store the text data and attributes of each additional text region identified in the frame. The data capture component may store this information in a data store for use in comparing information from previously received as well as subsequently received frames from the video stream. The data store may be persistent storage on a mobile device, memory of a mobile device, or network attached storage of a server. In some implementations, the data capture component may use the information stored in the data store to compare the text data of the identified text region with the text data of the respective text region of all frames received from the video stream.

Once the data capture component has identified a text region within the received frame whose data corresponds to the set of attributes associated with the target data field (e.g., is the best possible match to the data field), the data of the matching text region may be displayed in a display field of the user interface to be verified by the user. For example, the data of the matching text region may be displayed at the bottom of the display of a mobile phone beneath the viewfinder containing the crosshair. The user may verify that the data of the identified text region matches the target data field by providing user input indicating a confirmation in the user interface. The confirmation may be indicated by entering a touch screen command (e.g., pressing a display button on the screen), selecting a menu option, entering a voice command, or in any other manner.

In some implementations, the above process may be repeated for subsequently received frames in the video stream. The data capture component may then compare the data of the identified text region with the data of text regions of a subsequently received frame to determine if the subsequent frame contains a text region that is a closer match to the target data field than that in the previously received frame. The comparison of text regions from different frames can provide the ability to identify a text region that closely matches a target data field even if, for a particular frame, the viewfinder crosshairs may be pointed at a neighboring data field in the physical document rather than the target data field.

In some implementations, a text region that is identified in subsequent frames may be compared to the same text region of previous frames to identify the better image capture and data field recognition results among all of the received frames in the video stream.

To compare the data of the identified text region with the data of the respective text region of a subsequently received frame from the video stream, the data capture component may first select a subsequently received frame from the video stream. The subsequently received frame may be the next frame in the video stream. Alternatively, the subsequently received frame may be determined using the predetermined rate as described above (e.g., every second, fourth, sixth frame per second, etc.).

In some implementations, the data capture component may determine an offset between the previously selected frame and the subsequently received frame. The offset may be the difference between the coordinates of the identified text region of the previously selected frame and the coordinates of the respective text region of the subsequently received frame. Alternatively, the offset may be the difference between the coordinates of any text region that appears in both the previously selected frame and the subsequently received frame. The offset between two consecutively received frames may be computed, for example, using a gyroscope component of the mobile device.

The data capture component may then identify the respective text region of the subsequently received frame from the video stream. In some implementations, the respective text region may be identified by repeating the identification process described above. Alternatively, the data capture component may utilize the coordinates of the text region in the first frame and the offset between the first frame and the subsequently received frame to identify the respective text region in the subsequent frame (e.g., to identify the same text region in the subsequent frame). The data capture component may then determine the total attribute weight for the set of attributes associated with the respective text region, and compare the total attribute weights of the two text regions to determine which text region's data is the better match to the target data field.

In some implementations, the data capture component may additionally compare the data of the text region from the first frame and the data of the respective text region from the subsequent frame character by character. The same characters (e.g., the character in the same position for each of the text regions) may be compared using the confidence level for the character as determined during the OCR process described above. If the confidence level of the character recognition from the subsequent frame is higher than that of the previously selected frame, the text data recognized in respective text region of the subsequently received frame may replace the text data of the text region in the previously selected frame. This process may be repeated for each character in a text region to determine the text data that most accurately represents the data of the targeted data field.

In some implementations, the data capture component may additionally consider the number of times the same character has been recognized for a corresponding text region between frames. Thus, if the same character has been recognized with the same result in several previous frames, and only in subsequent frame with a different result, the data capture component may consider this to be an error in character recognition and discard the dissimilar character from consideration. Thus, the character that is recognized with the same result multiple times may be retained as the best matching character (e.g., the character that most closely matches the character in the same position of the target data field) regardless of the confidence level for the character. The data capture component may store this information, as well as other statistical information related to the character recognition, in a data store to be used to compare against the data from subsequent frames.

If the data capture component determines that the data of the respective text region of the subsequently received frame is a closer match to the target data field in view of the set of attributes associated with the target data field, the data of the identified text region from the previous frame may be updated or replaced. In some implementations, the data capture component may first determine that the value of the total attribute weight for the respective text region is greater than the value of the total attribute weight for the selected text region from the previous frame. The data capture component may then replace the data of the selected text region with the data of the respective text region, and subsequently store the data of the respective text region in the data store as the content that is a closer match to the target data field. In some implementations, processing logic may store the data of the respective text region in the memory of a mobile device. Alternatively, processing logic may store the data of the respective text region in persistent storage of a mobile device.

The data capture component may then provide a display field that includes the data of the identified text region for presentation with the frame in the user interface. Thus, each frame received by the data capture component can further clarify the text data in the frame that most closely matches the data field from the physical document. The display field can be continuously updated with the processing of each subsequently received frame from the video stream until the user confirms that the text data in the display field is the correct data.

As noted above, the user may confirm the correctness of data by providing input in the user interface. For example, the user may press a button on the application user interface. The data capture component may then receive a confirmation from the user that indicates that the data of the identified text region in the display field matches the data field of the physical document. If the data does not match, the user may continue to point the viewfinder crosshair at the target data field to repeat the process. If the data capture component has not received a confirmation within a period of time that meets a predetermined threshold, the process may automatically select the next frame for processing. If the data capture component is unable to determine the exact match for the data field, the user may skip any further attempts to identify the target data field, and enter the text data manually.

The data of the identified text region may then be stored in a data store as the correct data. In some implementations, processing logic may store the text data of the identified text region in local persistent storage on a mobile device. Alternatively, processing logic may send the data of the identified text region to a server to be stored in a database or network attached data store. The data capture component may then repeat the entire process for any additional data fields in the physical document that need to be captured. Once all data fields have been identified and the verified data stored, the data collected for all of the fields may be stored as a single collection for later use by another application on the mobile device. Alternatively, the data collection may be sent to a server for processing by another application or system.

Aspects of the present disclosure are thus capable of eliminating the need for preliminary digital template generation and equipment for specialized data entry from physical documents. More particularly, aspects of the present disclosure can conveniently capture, recognize, and verify data fields of a physical document using a video stream of a mobile device.

FIG. 1 depicts a high-level component diagram of an example computing device architecture in accordance with one or more aspects of the present disclosure. In illustrative examples, computing device 100 may be provided by various computing devices including a tablet computer, a smart phone, a notebook computer, a camera, a video camera, or the like.

Computing device 100 may comprise a processor 110 coupled to a system bus 120. Other devices coupled to system bus 120 may include memory 130, display 135 equipped with a touch screen input device 170, keyboard 140, network interface 160, and optical input device 150. The term "coupled" herein shall include both electrically connected and communicatively coupled via one or more interface devices, adapters, or the like.

Processor 110 may be provided by one or more processing devices including general purpose and/or specialized processors. Memory 130 may comprise one or more volatile memory devices (for example, RAM chips), one or more non-volatile memory devices (for example, ROM or EEPROM chips), and/or one or more storage memory devices (for example, optical or magnetic disks). Optical input device 150 may be and/or include one or more cameras, scanners, barcode readers, and/or any other device that is capable of generating images of a document.

In certain implementations, computing device 100 may comprise a touch screen input device 170 represented by a touch-sensitive input area and/or presence-sensitive surface overlaid over display 135. An example of a computing device implementing aspects of the present disclosure will be discussed in more detail below with reference to FIG. 6.

In certain implementations, memory 130 may store instructions of a data capture module 190 for facilitating video capture in a data capture scenario, as described above and in further detail below with respect to FIGS. 3-6. In an illustrative example, data capture module 190 may be implemented as a function to be invoked via a user interface of another application (e.g., a document scanning application). Alternatively, data capture module 190 may be implemented as a stand-alone application.

Figure 2:
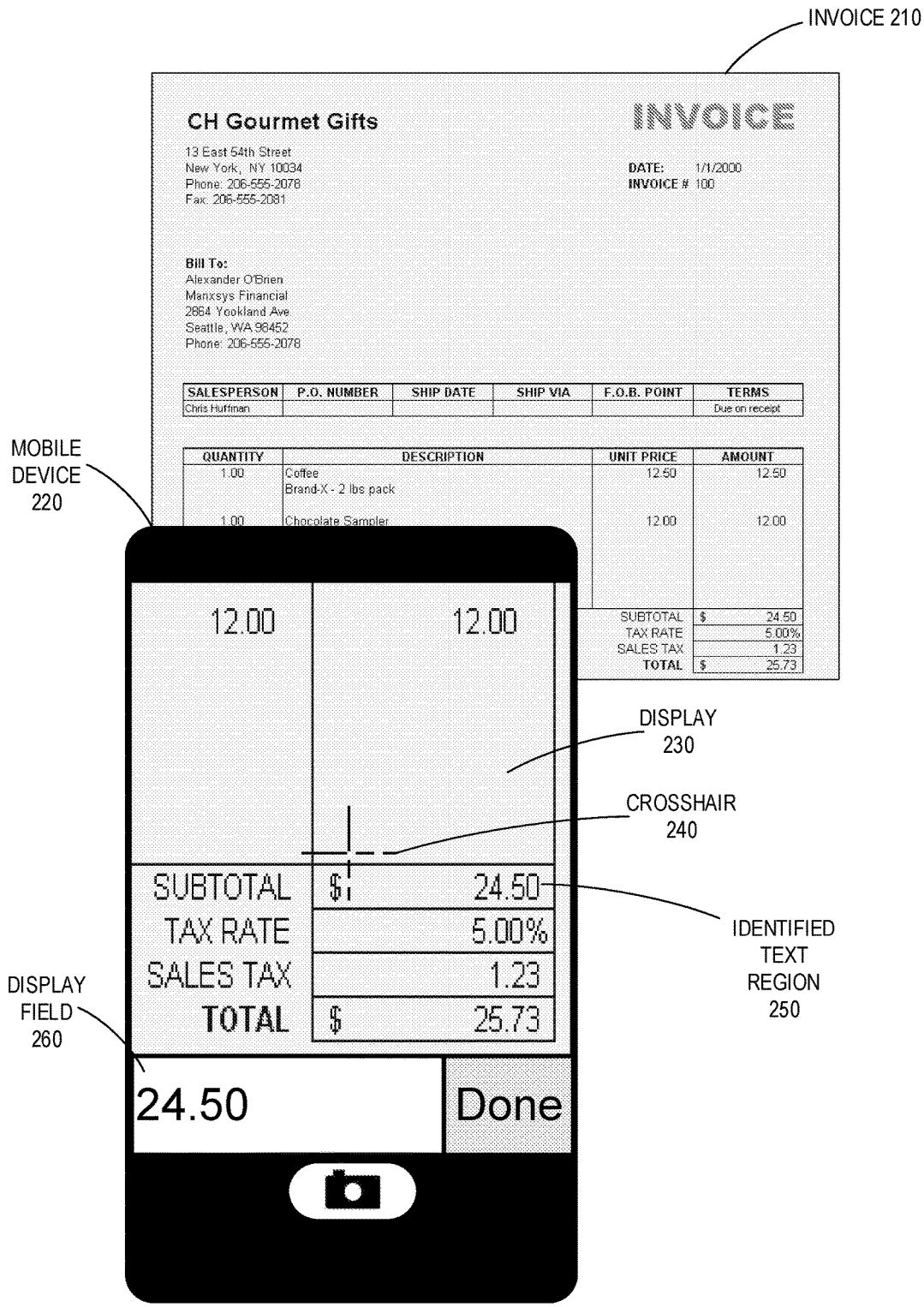
FIG. 2 depicts an example of a graphical user interface (GUI) of a mobile device for video capture in a data capture scenario, in accordance with one or more aspects of the present disclosure.

FIG. 2 illustrates an example of a graphical user interface (GUI) of a mobile device 220 for video capture in a data capture scenario. The GUI of mobile device 220 may be presented by a stand-alone application, a component of a user interface for document manager, or in any other manner. For example, the GUI of mobile device 220 may be presented to a user by data capture module 190 of FIG. 1 as described in detail below with respect to FIGS. 3-6.

Mobile device 220 may include an application configured to capture invoice 210 using the mobile device's camera. As illustrated in FIG. 2, the application may cause a GUI to be presented on mobile device 220 to assist the user with the identification of the subtotal field of invoice 210. The application may then activate the camera to begin receiving frames of a video stream through the camera of mobile device 220. The frames of the video stream may be displayed to the user via display 230. Crosshair 240 may be presented by the application in the display as a visual aid to assist the user in identifying the target data field (in this case the subtotal field) of invoice 210. The text regions of the received frame shown in the display may be identified. Data of the identified text regions may be determined and analyzed, and data of the identified text region 250 may be selected as the data that matches the subtotal field based on attributes associated with the subtotal data field in the application configuration. The application may then present the data of the identified text region 250 in display field 260 for user confirmation. The user may confirm the data in display field 260 by selecting the "Done" button shown on the display of mobile device 220.

Figure 3:
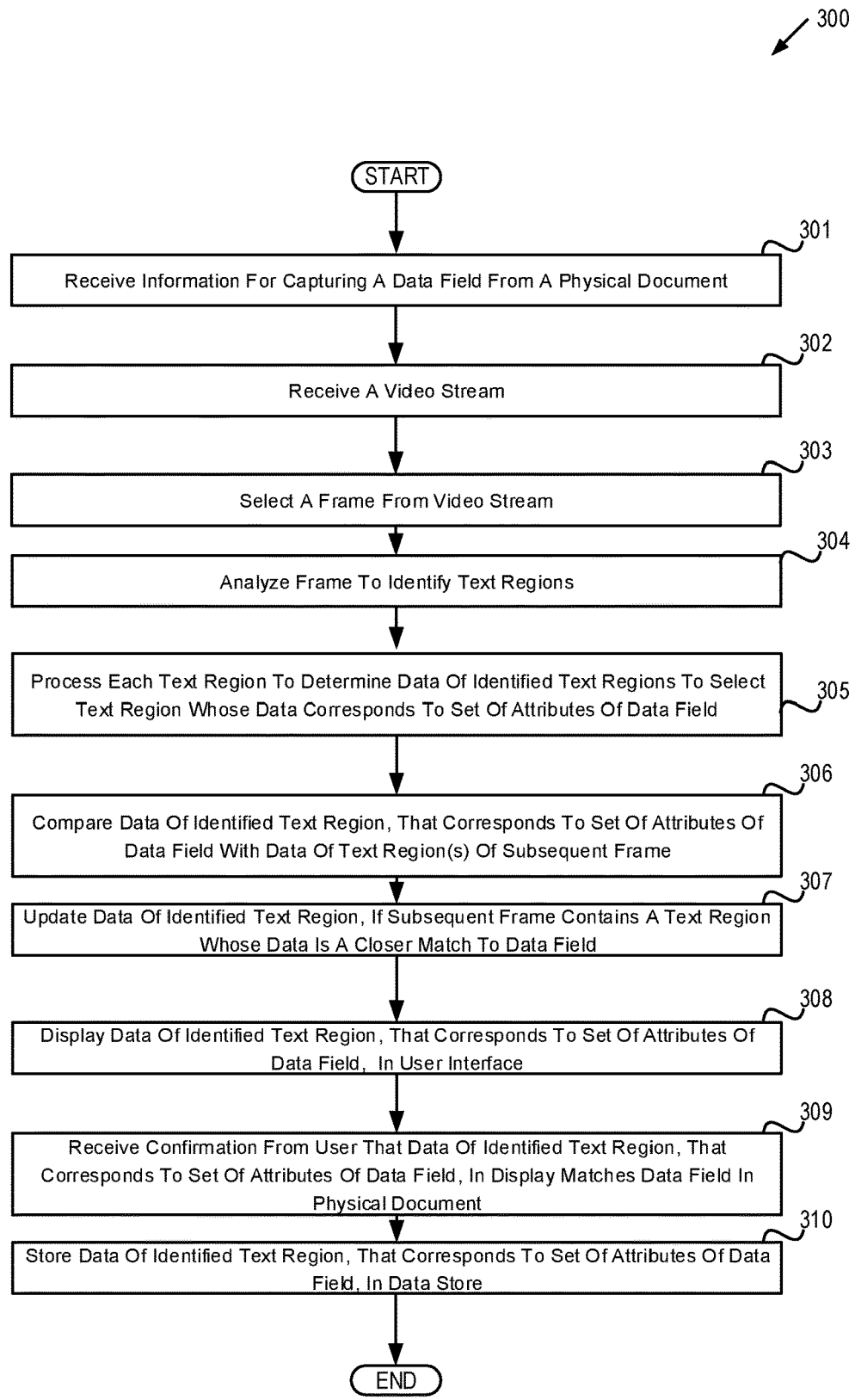
FIG. 3 depicts a flow diagram of a method for video capture in a data capture scenario, in accordance with one or more aspects of the present disclosure.

FIG. 3 depicts a flow diagram of an example method 300 for video capture in a data capture scenario. The method may be performed by processing logic that may comprise hardware (circuitry, dedicated logic, etc.), software (such as is run on a general purpose computer system or a dedicated machine), or a combination of both. In one illustrative example, method 300 may be performed by data capture module 190 in FIG. 1. Alternatively, some or all of method 300 might be performed by another module or machine. It should be noted that blocks depicted in FIG. 3 could be performed simultaneously or in a different order than that depicted.

At block 301, processing logic can receive information for identification of a data field in a physical document. The information may include the name of the field containing the data (e.g., Company Name, Bank Identification Code, Account Number, Reason for Payment, Payment Sum), as well as the type of data common for the field (e.g., Address, Time, Date, Cash Amount, Name, Code, Text, Number, etc.), the number of character spaces, additional data control rules enabling verification of the recognized field data (e.g., dictionaries, regular expressions, check sums, etc.), or the like. For example, a user may launch an application on a camera-equipped mobile phone, and processing logic may receive the information for identification of the data field in the physical document. Subsequently, based on the received information, processing logic may invoke a user interface on the mobile phone to assist the user with identifying the data field in the physical document. In an illustrative example, the user interface may present a graphical indicator on the screen of the mobile device (e.g., crosshairs, a target icon, etc.) to assist a user with identifying the data field in the physical document. Processing logic may direct the user to point the crosshair of the mobile device viewfinder at a particular data field of the document to be captured.

At block 302, processing logic can receive a video stream (e.g., after the user activates the camera of the user device). The video stream may be made up of multiple frames, where each frame may include a portion of the physical document containing the data field of the document. A frame can include content (e.g., an image) displayed on the screen of the mobile device produced using the camera viewfinder. The frame can be transmitted in real time without recording the video, capturing the image, or storing the image in memory or a persistent data store. The viewfinder may support real time transfer of the video data from the mobile device camera to its display, showing the image captured.

At block 303, processing logic can select a frame from the plurality of frames in the video stream. In some implementations, the frames presented in the mobile device viewfinder can be selected at a predetermined rate. For example, the frames may be selected from the video stream at a rate of every 10th frame per second. Alternatively, other rates may be used (e.g., every first, second, fourth, sixth frame per second, etc.). Additionally, an frame may be selected if the mobile device camera is focused on the object to be captured (e.g., the portion of the physical document containing the data field) for a certain period of time (e.g., ½ second, one second, two seconds, etc.).

At block 304, processing logic can analyze the frame to identify one or more text regions in the frame. Text regions may be detected, for example, using identification of connected components (e.g., features in an image of a particular shape) and subsequently grouping them into potential words. Alternatively, the text regions may be detected using any similar method of image identification.

At block 305, processing logic may process the identified text regions. To process the identified text regions, processing logic may determine the data of each identified text region (e.g., using OCR). The data of each identified text region may include text data (a result of OCR of the text region) and attribute values for the text data. Then processing logic may analyze the data of identified text regions in the frame to select the text region whose data corresponds to the set of attributes associated with the data field. In an illustrative example, processing logic may process the text regions as described below with respect to FIG. 4.

At block 306, processing logic can compare the data of the identified text region, that corresponds to the set of attributes associated with the target data field, with data of text region(s) of a subsequently received frame. Processing logic can make this comparison to determine whether the subsequent frame contains a text region whose data is a closer match to the target data field than that in the previously received frame. At block 307, processing logic can update the data of the identified text region, that corresponds to the set of attributes associated with the target data field, if the data of the text region(s) of the subsequently received frame is a closer match to the target field in view of the set of attributes. In an illustrative example, processing logic may compare the data of the additional text regions from a previous frame with the data of the respective text region(s) from the subsequent frame and update the data of the additional identified text region(s) as described below with respect to FIG. 5. "Additional" is referred to all identified text regions except the one whose data is currently considered as a candidate for the closest match.

At block 308, processing logic can display the data of the identified text region, that corresponds to set of attributes of target data field, in the user interface. The displayed data is the best match for the target data field (e.g., based on a corresponding total attribute weight). The data in the display field can be continuously updated with the processing of each subsequently received frame from the video stream until such time as the user confirms that the data in the display field is the correct data.

At block 309, processing logic can receive a user confirmation via the user interface that indicates that the data of the identified text region in the display field matches the data field of the physical document. For example, the user may press a button on the application user interface. At block 310, processing logic can store the data of the identified text region in a data store. In some implementations, processing logic may store the data of the identified text region in local persistent storage on a mobile device. Alternatively, processing logic may send the data of the identified text region to a server to be stored in a database or network attached data store. After block 309, the method of FIG. 3 terminates.

Figure 4:
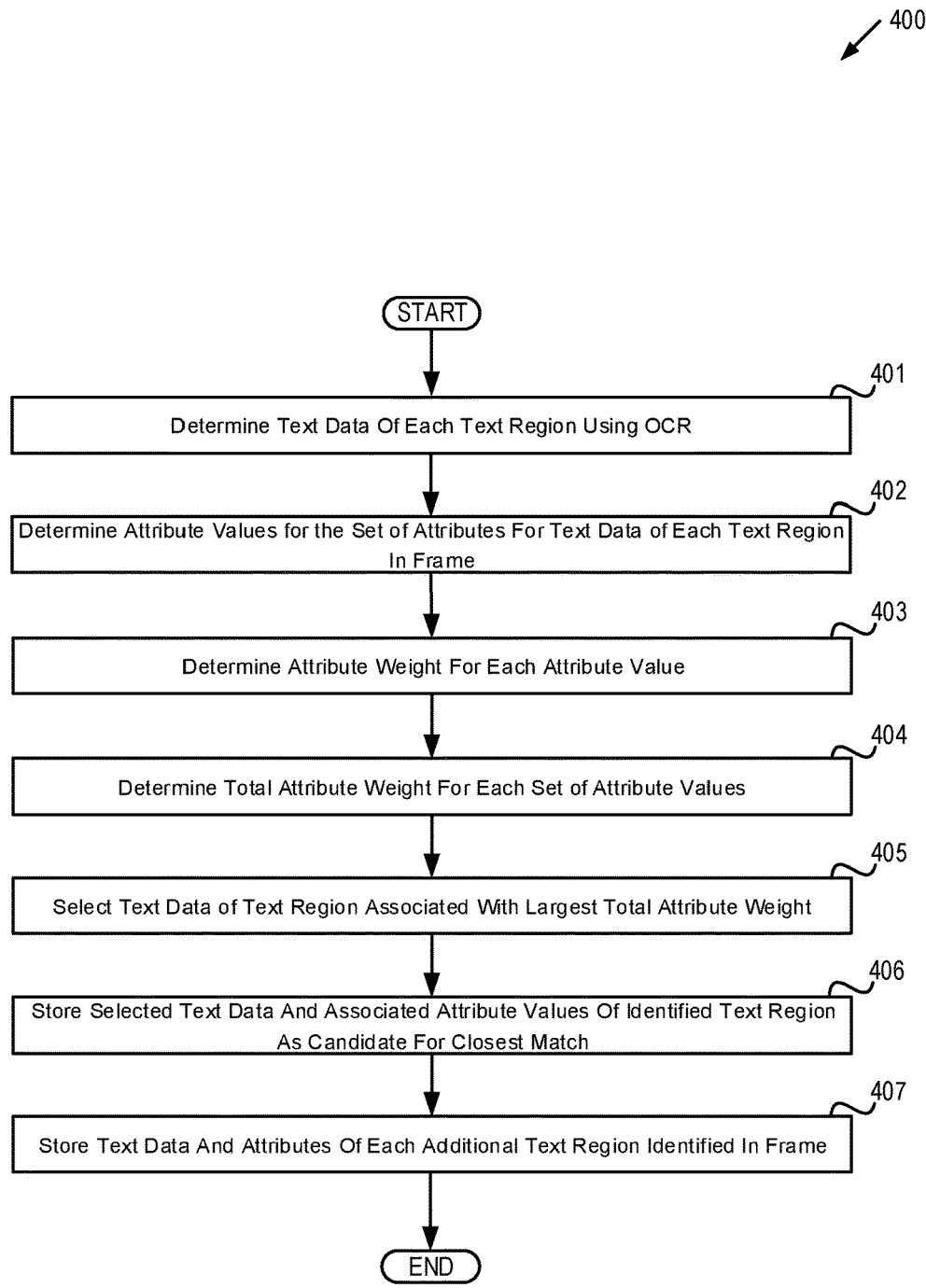
FIG. 4 depicts a flow diagram of a method for processing text regions in an image frame, in accordance with one or more aspects of the present disclosure

FIG. 4 depicts a flow diagram of an example method 400 for processing the data of text regions in a frame. The method may be performed by processing logic that may comprise hardware (circuitry, dedicated logic, etc.), software (such as is run on a general purpose computer system or a dedicated machine), or a combination of both. In one illustrative example, method 400 may be performed by data capture module 190 in FIG. 1. Alternatively, some or all of method 400 might be performed by another module or machine. It should be noted that blocks depicted in FIG. 4 could be performed simultaneously or in a different order than that depicted.

At block 401, processing logic can determine text data of each text region using OCR. The image of the text region can thus be converted into text data (e.g., a string of codes used to represent the characters of the text region). The resulting text data may include a hypothesis for each character, hypothesis's confidence level, as well as the location of each character in the frame (e.g., the coordinates of the text within the frame).

At block 402, processing logic can determine attribute values for the set of attributes for text data of each text region in the frame. At block 403, processing logic can determine an attribute weight for each attribute value. The weight value can indicate the attribute's relative importance in identifying a text region whose data may match the targeted data field. For example, the proximity of the text region to the crosshairs may be assigned a greater weight since it would be expected that a user would place the crosshairs over the targeted data field of the physical document while the camera is receiving the video stream. Alternatively, the data format may be given greater weight than proximity if a large number of text regions are present in the frame, only one of which appears to have the proper format.

At block 404, processing logic can determine a total attribute weight for each set of attribute values. The total attribute weight may be determined by summing the weights for the individual attribute values associated with each of the text regions. At block 405, processing logic can select data of a text region associated with the total attribute weight having the largest value (e.g., having the top value). The identified text region with the greatest total attribute weight may then be selected as the text region that most closely matches the targeted data field from the physical document (e.g., the "best" possible match for the received frame). At block 406, processing logic may then store the selected text data and associated attributes of the identified text region as a candidate for the closest match. At block 408, processing logic may store the text data and attributes of each additional text region identified in the frame. At blocks 406 and 407, processing logic may store the information in a data store for use in comparing information from previously received as well as subsequently received frames from the video stream. The data store may comprise persistent storage on a mobile device, memory of a mobile device, or network attached storage of a server communicating with a mobile device. After block 407, the method of FIG. 4 terminates.

Figure 5:
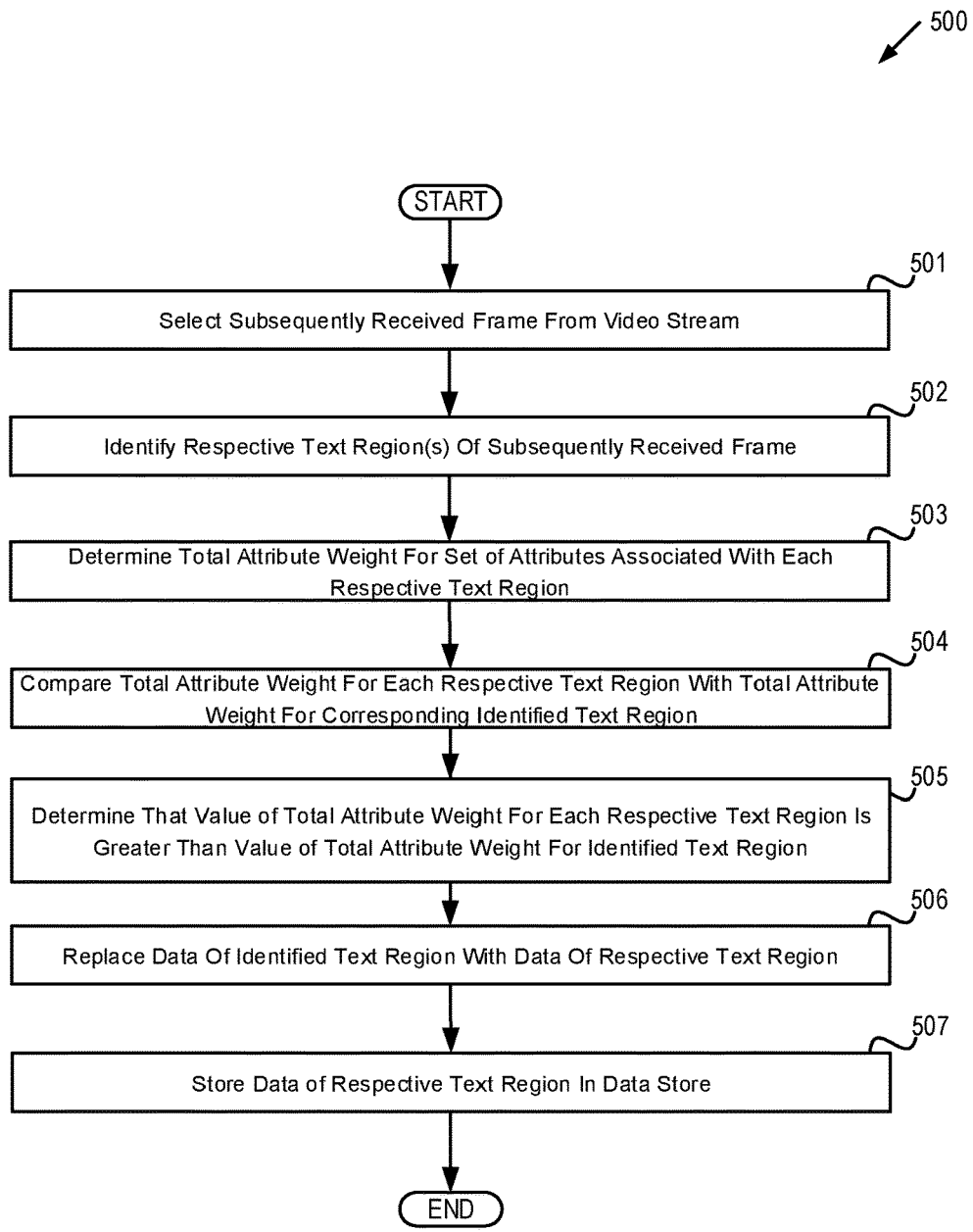
FIG. 5 depicts a flow diagram of a method for updating data of an identified text region with data from subsequent image frames, in accordance with one or more aspects of the present disclosure.

FIG. 5 depicts a flow diagram of an example method 500 for updating data of one or more identified text regions with data of one or more respective text regions from subsequent frames. The method may be performed by processing logic that may comprise hardware (circuitry, dedicated logic, etc.), software (such as is run on a general purpose computer system or a dedicated machine), or a combination of both. In one illustrative example, method 500 may be performed by data capture module 190 in FIG. 1. Alternatively, some or all of method 500 might be performed by another module or machine. It should be noted that blocks depicted in FIG. 5 could be performed simultaneously or in a different order than that depicted.

At block 501, processing logic can select a subsequently received frame from the video stream. The subsequently received frame may be the next frame in the video stream. Alternatively, the subsequently received frame may be determined using the evaluation rate (e.g., every second, fourth, sixth frame per second, etc.).

At block 502, processing logic can identify a respective text region(s) of the subsequently received video frame. In some implementations, the respective text region(s) may be identified by repeating the identification process described above with respect to FIG. 3. Alternatively, processing logic may utilize the coordinates of each identified text region in the first frame and the offset between the first frame and the subsequently received frame to identify the respective text region in the subsequent frame (e.g., to identify the same text region in the subsequent frame).

At block 503, processing logic can determine, for each respective text region, the total attribute weight for the set of attributes associated with the respective text region. At block 504, processing logic can compare, for each identified text region from the previous frame, the total attribute weight for the respective text region with the total attribute weight for the identified text region from the previous frame. At block 506, processing logic can replace, for each identified text region from the previous frame, the data of the identified text region with the data of the respective text region if the value of the total attribute weight for the respective text region is greater than the value of the total attribute weight for the selected text region from the previous frame, as determined at block 505. At block 507, processing logic can store the data of the respective text region(s) in a data store. In some implementations, processing logic may store the data of the respective text region(s) in the memory of a mobile device. Alternatively, processing logic may store the data of the respective text region(s) in persistent storage of a mobile device. After block 506, the method of FIG. 5 terminates.

Figure 6:
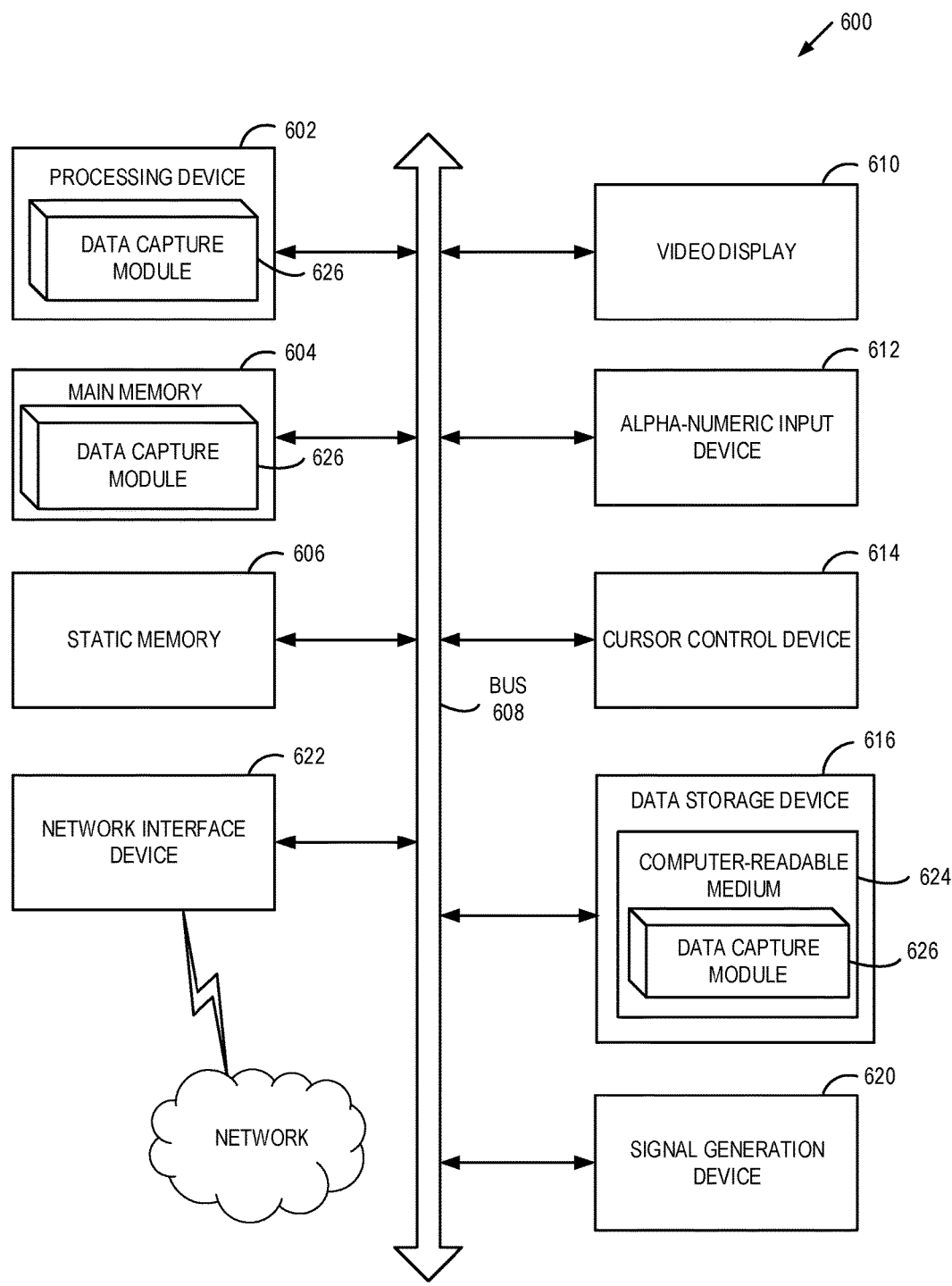
FIG. 6 depicts a block diagram of an illustrative computer system operating in accordance with examples of the invention.

FIG. 6 depicts an example computer system 600 which can perform any one or more of the methods described herein. In one example, computer system 600 may correspond to computing device 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to data capture module 626 for performing the operations and steps discussed herein (e.g., corresponding to the methods of FIGS. 3-5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a computer-readable medium 624 on which is stored data capture module 626 (e.g., corresponding to the methods of FIGS. 3-5, etc.) embodying any one or more of the methodologies or functions described herein. Data capture module 626 may also reside, completely or at least partially, within the main memory 604 and/or within the processing device 602 during execution thereof by the computer system 600, the main memory 604 and the processing device 602 also constituting computer-readable media. Data capture module 626 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "selecting," "analyzing," "comparing," "updating," "providing," "identifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving, by at least one processor, a video stream comprising a plurality of frames, wherein the plurality of frames depict a data field in a physical document;
   identifying, by the at least one processor, one or more text regions in an initial frame among the plurality of frames, and one or more text regions in a subsequent frame among the plurality of frames;
   selecting, by the at least one processor, data of a text region among the one or more text regions in the initial frame that corresponds to a set of attributes associated with the data field, and data of a text region among the one or more text regions in the subsequent frame that corresponds to the set of attributes associated with the data field;
   determining, by the at least one processor, that the data of the text region of the subsequent frame is a closer match to the set of attributes than the data of the text region of the initial frame;
   updating, by the at least one processor, the data of the text region of the initial frame with the data of the text region of the subsequent frame in response to the determination that the data of the text region of the subsequent frame is the closer match to the set of attributes than the data of the text region of the initial frame; and
   providing, by the at least one processor, a display field comprising the updated data of the text region of the initial frame for presentation with the initial frame in a user interface.

2. The method of claim 1, further comprising:
   receiving, via the user interface, a confirmation indicating that the updated data of the text region in the display field matches the data field of the physical document; and
   storing the updated data of the text region from the display field in a data store.

3. The method of claim 1, wherein the data of each of the one or more text regions of the initial frame and the subsequent frame comprises a text data and attribute values, and wherein the method further comprises:
   determining the text data of each of the one or more text regions of the initial frame and the subsequent frame using optical character recognition (OCR);
   determining the attribute values of the set of attributes for the text data of each of the one or more text regions in the initial frame and the subsequent frame;

determining an attribute weight for each of the attribute values for the text data of each of the text regions in the initial frame and the subsequent frame;

determining a total attribute weight for the attribute values for the text data of each of the one or more text regions in the initial frame and the subsequent frame, wherein the total attribute weight comprises a sum of the attribute weights for the set of attributes;

selecting the text region of the initial frame and the subsequent frame whose data is associated with a largest total attribute weight; and storing the data of the text region of the initial frame and the subsequent frame as a candidate for a closest match to the set of attributes.

4. The method of claim 3, wherein the data of the text region of the subsequent frame is the closest match to the set of attributes.

5. The method of claim 3, further comprising: comparing the largest total attribute weight for each of the one or more text regions of the subsequent frame to the largest total attribute weight for each of the one or more text regions of the initial frame.

6. The method of claim 1, wherein updating the data of the text region of the initial frame comprises:

replacing the data of the text region of the initial frame with the data of the text region of the subsequent frame; and storing the replaced data of the text region of the initial frame in a data store.

7. The method of claim 1, wherein determining that the data of the one or more text regions of the subsequent frame is the closer match to the set of attributes than the data of the one or more text regions of the initial frame comprises comparing the data of the one or more text regions of the initial frame with the data of the one or more text regions of the subsequent frame.

8. The method of claim 7, wherein comparing the data of the one or more text regions of the initial frame with the data of the text one or more regions of the subsequent frame comprises:

determining a total attribute weight for the set of attributes associated with each of the one or more text regions of the initial frame and the subsequent frame; and comparing a total attribute weight for each of the one or more text regions of the subsequent frame with a total attribute weight for a corresponding one of the one or more text regions of the initial frame.

9. The method of claim 7, wherein identifying the one or more text regions of the subsequent frame comprises:

determining an offset between the initial frame and the subsequent frame using a gyroscope; and calculating coordinates of each of the one or more text regions of the subsequent frame using the offset and coordinates of each of the one or more text regions of the initial frame.

10. The method of claim 7, further comprising updating data of one or more additional ones of the one or more text regions of the initial frame comprising:

determining that a total attribute weight for one or more additional ones of the one or more text regions of the subsequent frame is greater than a total attribute weight for the additional ones of the one or more text regions of the initial frame;

replacing data of the additional ones of the one or more text regions of the initial frame with data of the additional ones of the one or more text regions of the subsequent frame; and storing the replaced data of the additional ones of the one or more text regions of the initial frame in a data store.

11. The method of claim 1, further comprising invoking the user interface on a mobile phone to assist a user with identifying the data field in the physical document.

12. A system comprising:

at least one memory that stores instructions; and at least one processor configured to execute the instructions to:

receive a video stream comprising a plurality of frames, wherein the plurality of frames depict a data field in a physical document;

identify one or more text regions in an initial frame among the plurality of frames, and one or more text regions in a subsequent frame among the plurality of frames;

select data of a text region among the one or more text regions in the initial frame that corresponds to a set of attributes associated with the data field, and data of a text region among the one or more text regions in the subsequent frame that corresponds to the set of attributes associated with the data field;

determine that the data of the text region of the subsequent frame is a closer match to the set of attributes than the data of the text region of the initial frame;

update the data of the text region of the initial frame with the data of the text region of the subsequent frame in response to the determination that the data of the text region of the subsequent frame is the closer match to the set of attributes than the data of the text region of the initial frame; and provide a display field comprising the updated data of the text region of the initial frame for presentation with the initial frame in a user interface.

13. The system of claim 12, wherein the at least one processor is further to execute the instructions to:

receive, via the user interface, a confirmation indicating that the updated data of the text region in the display field matches the data field of the physical document; and store the updated data of the text region from the display field in a data store.

14. The system of claim 12, wherein the data of each of the one or more text regions of the initial frame and the subsequent frame comprises a text data and attribute values, and wherein the at least one processor is further to execute the instructions to:

determine the text data of each of the one or more text regions of the initial frame and the subsequent frame using optical character recognition (OCR);

determine the attribute values of the set of attributes for the text data of each of the one or more text regions in the initial frame and the subsequent frame;

determine an attribute weight for each of the attribute values for the text data of each of the one or more text regions in the initial frame and the subsequent frame;

determine a total attribute weight for the attribute values for the text data of each of the one or more text regions in the initial frame and the subsequent frame, wherein the total attribute weight comprises a sum of the attribute weights for the set of attributes;

select the text region of the initial frame and the subsequent frame whose data is associated with a largest total attribute weight; and store the data of the text region of the initial frame and the subsequent frame as a candidate for a closest match to the set of attributes.

15. The system of claim 14, wherein the data of the text region of the subsequent frame is the closest match to the set of attributes.

16. The system of claim 14, wherein the at least one processor is further to execute the instructions to compare the largest total attribute weight for each of the one or more text regions of the subsequent frame to the largest total attribute weight for each of the one or more text regions of the initial frame.

17. The system of claim 12, wherein, to update the data of the text region of the initial frame, the at least one processor is further to execute the instructions to:
replace the data of the text region of the initial frame with the data of the text region of the subsequent frame; and
store the replaced data of the text region of the initial frame in a data store.

18. The system of claim 12, wherein the at least one processor is further to execute the instructions to invoke the user interface on a mobile phone to assist a user with identifying the data field in the physical document.

19. A non-transitory computer readable storage medium having instructions stored therein that, when executed by at least one processor, cause the at least one processor to:
receive, by the at least one processor, a video stream comprising a plurality of frames, wherein the plurality of frames depict a data field in a physical document;
identify, by the at least one processor, one or more text regions in an initial frame among the plurality of frames, and one or more text regions in a subsequent frame among the plurality of frames;
select, by the at least one processor, data of a text region among the one or more text regions in the initial frame that corresponds to a set of attributes associated with the data field, and data of a text region among the one or more text regions in the subsequent frame that corresponds to the set of attributes associated with the data field;
determine, by the at least one processor, that the data of the text region of the subsequent frame is a closer match to the set of attributes than the data of the text region of the initial frame;
update, by the at least one processor, the data of the text region of the initial frame with the data of the text region of the subsequent frame in response to the determination that the data of the text region of the subsequent frame is the closer match to the set of attributes than the data of the text region of the initial frame; and
provide, by the at least one processor, a display field comprising the updated data of the text region of the initial frame for presentation with the initial frame in a user interface.

20. The non-transitory computer readable storage medium of claim 19, wherein data of each of the one or more text regions of the initial frame and the subsequent frame comprises a text data and attribute values, and wherein the instructions are further to cause the at least one processor to:
determine the text data of each of the one or more text regions of the initial frame and the subsequent frame using optical character recognition (OCR);
determine the attribute values of the set of attributes for the text data of each of the one or more text regions in the initial frame and the subsequent frame;
determine an attribute weight for each of the attribute values for the text data of each of the one or more text regions in the initial frame and the subsequent frame;
determine a total attribute weight for the attribute values for the text data of each of the one or more text regions in the initial frame and the subsequent frame, wherein the total attribute weight comprises a sum of the attribute weights for the set of attributes;
select the text region of the initial frame and the subsequent frame whose data is associated with a largest total attribute weight; and
store the data of the text region of the initial frame and the subsequent frame as a candidate for a closest match to the set of attributes.

* * * * *